Figure 1:
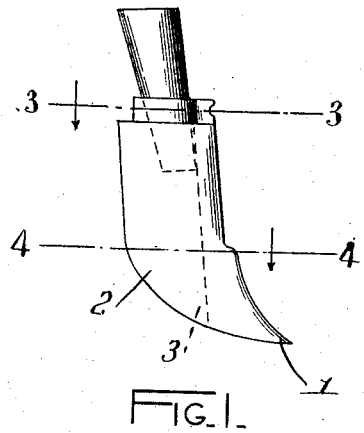

G. & M. SMITH.
GRAIN DRILL TOOTH.
APPLICATION FILED APR. 2, 1908.

908,811.

Patented Jan. 5, 1909.

Witnesses:
Eugene M. Sliney.
W. S. Babcock.

Gordon Smith,
Maynard Smith
Inventors

By Marion & Marion
Attorneys

UNITED STATES PATENT OFFICE.

GORDON SMITH AND MAYNARD SMITH, OF WEYBURN, SASKATCHEWAN, CANADA.

GRAIN-DRILL TOOTH.

No. 908,811.   Specification of Letters Patent.   Patented Jan. 5, 1909.

Application filed April 2, 1908. Serial No. 424,820.

*To all whom it may concern:*

Be it known that we, GORDON SMITH and MAYNARD SMITH, subjects of the King of Great Britain, residing at Weyburn, in the Province of Saskatchewan, Canada, have invented certain new and useful Improvements in Grain-Drill Teeth; and we do hereby declare that the following is a full, clear, and exact description of the invention, such as will enable others skilled in the art to which it appertains to make and use the same.

The present invention relates to grain drill teeth, and more particularly to that character of drill tooth used in planting cereals such as wheat and the like, wherein a plow or tooth precedes a funnel or delivery tube, opening up a furrow into which the grain is delivered from the funnel. The essential requirements of a drill tooth of this character are, easy, light draft, non-clogging of the delivery opening, and, above all, equal adaptability to all characters of soil in which it may be used. Many of the drills now in use are adapted for soft light soil only, and when applied to hard ground will not work. They cannot be kept in hard soil for any length of time, but are continually forced to the surface and become useless. Many others cannot be successfully used in damp ground. Their delivery openings do not bear the proper relative position to the point, and consequently when in damp ground the earth crowds in behind the point and clogs the delivery opening, thus rendering the tooth absolutely useless, and in many others the tooth is not formed so as to readily cut a furrow with the lightness of draft essential to a grain drill. The present drill tooth has been designed with the sole idea of overcoming these objections and producing a drill tooth embodying all of the essentials to an easy working, effective drill tooth— *i. e.*—adaptability to all soils, easy draft and non-clogging of the delivery opening.

In order to clearly disclose the construction, operation and use of the drill tooth, reference should be had to the accompanying drawings forming part of the present application, in which similar reference characters designate like parts in the several views.

Figure 2:
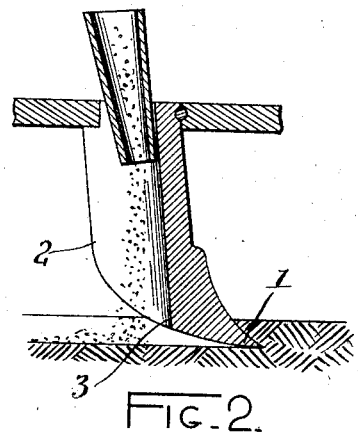
Figure 3:
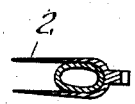
Figure 4:

In the drawings: Figure 1 is a side elevation of the tooth; Fig. 2 is a central longitudinal sectional view of Fig. 1; Fig. 3 is a cross section on line 3—3 of Fig. 1; and, Fig. 4 is a cross section on line 4—4 of Fig. 1.

In the preferred form of the device, the drill proper comprises a long forwardly and downwardly curved tapered sharp point 1. The curved portion is concaved in form, thus allowing the tip of the point to enter the earth in advance of the curve. The curved portion leading from the point upward beyond the draft line is sharpened to constitute a cutting edge coöperating with the point in opening the furrow. The tooth is extended upwardly from the curve and provided with a notch adapted to receive a pin by which the tooth may be removably secured to a frame. Side plates 2 are formed integrally with the point, or may be welded or otherwise secured thereto, such plates extending rearwardly and acting to absolutely prevent loose soil entering and clogging the delivery opening 3.

From this construction it will be seen that the lowest and most advanced portion of the delivery opening of the tooth is completely shielded from loose earth on all sides. It is shielded in front by the downwardly projecting point 1, and on either side by the rearwardly projecting plates 2, so that it is practically impossible for the shoe to become clogged. The inclination of the point makes it possible to use the tooth in soil of any character, whether hard or soft, wet or dry, light or heavy, and the concave curve of the edge leading rearwardly and upwardly from the point gives an easy upward and forward drawing cut to the tooth, thereby allowing the minimum of draft.

Clearly, many changes in the minor details of construction, in the manner of applying the tooth and its use may be resorted to, without in any way departing from the field and scope of the invention, and it is meant to include all such in the invention as disclosed by the present application illustrating the preferred form only of the tooth.

Having thus fully described our invention, what we claim as new, and desire to secure by Letters Patent, is:—

1. A drill tooth of the character described, comprising a forwardly and downwardly inclined blade having a concaved forward cutting edge and a tip projecting forwardly and downwardy from said edge, plates extending rearwardly from said point, and a delivery passageway through said point and terminating at the rear and above the tip of said point.

2. A drill tooth of the character described, comprising a forwardly and downwardly inclined point terminating in a sharp penetrating tip and provided with a concaved cutting edge adapted to give an upward draw cut, plates integrally formed with said point and extending rearwardly therefrom, and a delivery passageway through said point opening at the rear and above the penetrating tip of the point, whereby clogging of the delivery opening is prevented.

In witness whereof we have hereunto set our hands in the presence of two witnesses.

GORDON SMITH.
MAYNARD SMITH.

Witnesses:
 WM. J. BAXTER,
 M. J. PIERCE.